United States Patent [19]

Mead et al.

[11] Patent Number: 4,876,534
[45] Date of Patent: Oct. 24, 1989

[54] SCANNING METHOD AND APPARATUS FOR CURRENT SIGNALS HAVING LARGE DYNAMIC RANGE

[75] Inventors: Carver A. Mead, San Jose; Timothy P. Allen, Mountain View, both of Calif.

[73] Assignee: Synaptics Incorporated, San Jose, Calif.

[21] Appl. No.: 152,894

[22] Filed: Feb. 5, 1988

[51] Int. Cl.⁴ .................. H04N 3/12; H04N 9/07
[52] U.S. Cl. .................. 340/825.950; 340/825.850; 340/825.790; 358/212; 358/213.11; 307/494
[58] Field of Search .................. 340/825.86, 825.95, 340/825.94, 825.79, 825.85; 358/213.11, 241, 212; 307/490–494, 580, 201; 250/578, 214 L; 330/257, 259; 357/30, 32

[56] References Cited

U.S. PATENT DOCUMENTS

| | | | |
|---|---|---|---|
| 4,463,383 | 7/1984 | Soneda et al. | 358/212 |
| 4,465,978 | 8/1984 | Helmstetter | 307/493 |
| 4,471,227 | 9/1984 | D'Ascenzo | 340/825.95 |
| 4,542,409 | 9/1985 | Ochi | 358/212 |
| 4,565,935 | 1/1986 | Rolfe | 307/492 |

Primary Examiner—Donald J. Yusko
Assistant Examiner—E. O. Pudpud
Attorney, Agent, or Firm—Irell & Manella

[57] ABSTRACT

There is disclosed herein apparatus and a method for scanning information off a processing plane where the information is contained in a current signal having a very small amplitude and which can change signs and vary in amplitude by as much as five orders of magnitude. The preferred embodiment of the apparatus uses a pair of CMOS pass transistors connected to the individual processing elements and the row select lines. The pass transistors, when turned on, couple the output current from the processor containing the desired information to a column line. The column line is connected to a current to voltage converter in the form of a differential input amplifier having a non linear feedback circuit comprised of two diode connected CMOS transistors operating in the subthreshold region. The non linear feedback circuit provides an exponential transfer function which compresses the dynamic range of the output current from the processor to a smaller and more useable output range for an output voltage. The negative feedback to the inverting input coupled to the column line stabilizes the voltage on the column line to virtual ground thereby eliminating the delay associated with driving the parasitic capacitance of the column line with the very small output current from the processor in an attempt to substantially change the voltage of the column line.

33 Claims, 8 Drawing Sheets

FIG. 3(b)        (PRIOR ART)

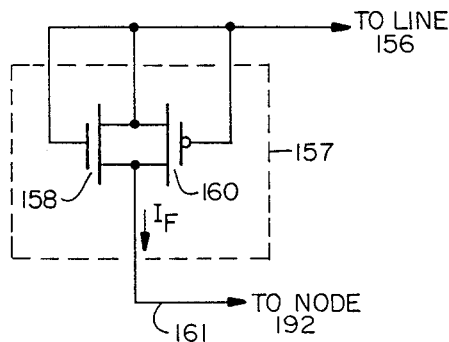
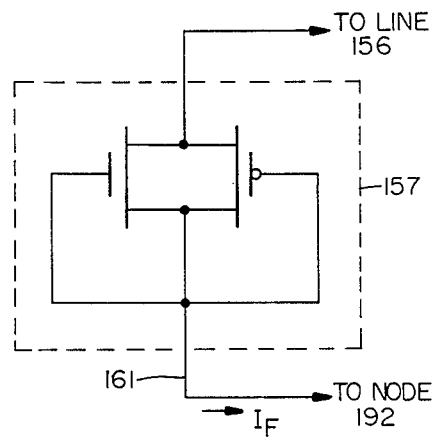
FIG. 8(c)          FIG. 8(d)
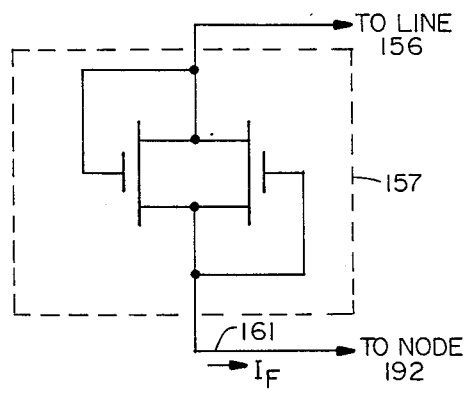
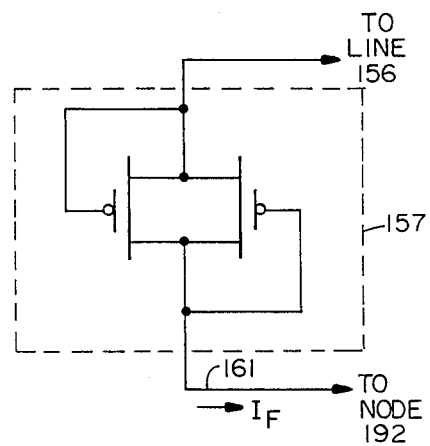
FIG. 8(e)          FIG. 8(f)

SCANNING METHOD AND APPARATUS FOR CURRENT SIGNALS HAVING LARGE DYNAMIC RANGE

BACKGROUND OF THE INVENTION

The invention relates generally to methods and apparatus for scanning arrays of information-containing locations where the information is embodied in current signals having large dynamic range. More particularly, the invention relates to methods and apparatus for scanning two-dimensional processing surfaces comprised of numerous individual local analog processing elements doing local spatial processing which generate output information in the form of current signals which can vary by as many as 4–5 orders of magnitude in amplitude and which can change sign.

There is an ongoing interest in further development of processing planes comprised of large numbers of local, simple processing elements which do local spatial processing of input information. Such input information can include visible light input, auditory input, or other patterns of signal activity. Further, such processing planes can include neural networks wherein the operation of the brain is emulated. In such processing planes, information in the form of memories and processes such as association can be represented by outputs in the form of current signals having variable sign and large dynamic range.

The advantage of using such processing planes having numerous processing elements is that a great deal of processing may be done in concurrent fashion, thereby allowing large amounts of information to be processed in a short time.

However, the use of processing planes creates certain problems in attempting to utilize the information generated on the processing plane. Typically, all the information generated by all the processing elements on the plane must be periodically read and evaluated or subjected to further processing. Typically, this scanning of the processing elements in the plane occurs periodically at a very high repetition rate. This requires that the information from very large numbers of processing elements, on the order of $10^4$ individual processing units, be read out at sufficiently rapid rates to allow further processing to be performed. Such further processing of the signals from the local processing elements can include such processes as pattern recognition, movement detection and so on. This repetitive readout of the information generated on the processing plane must be done very rapidly to allow very complex and changing input stimulus to be analyzed with sufficient resolution in time. Large numbers of processors are required for adequate resolution in space.

Typically, the output signals from the individual processing elements on the processing plane are very tiny currents which can change in sign and which can vary in amplitude by as many as $10^5$ orders of magnitude. Therefore, a need has arisen for a scanning circuit and method which can rapidly scan information off a processing plane having on the order of 10,000 or more processing elements where the information is embodied in the form of currents having amplitudes as small as picoamperes which can change in sign and vary by as many as five orders of magnitude.

SUMMARY OF THE INVENTION

According to the teachings of the invention there is taught herein a scanning method and apparatus for reading information from the individual processing elements on a processing surface with adequate speed to scan the information from very large numbers of processing elements in a very short time. Typically, the output signal from each processor is a current signal having a very small amplitude and can vary in direction and can vary in magnitude by as much as five orders of magnitude. In the preferred embodiment, the scanning apparatus is comprised of a pair of CMOS pass gate transistors that have their gates coupled to row address signals which are simultaneously activated. One of these row address signals is active low and the other is active high. The current output signal from the processor is coupled through these pass gate transistors to a column line. The column line is coupled to a circuit which provides a current to voltage conversion with compression such that the output signal is a voltage which maps to the original current output signal from the processor but which is compressed such that the dynamic range of the output voltage is substantially less than the dynamic range of the original output current. This conversion and compression function is accomplished with a differential input amplifier having its inverting input coupled to the column line and its non inverting input coupled to a reference voltage. The output of the amplifier is coupled back to the inverting input through a non linear feedback network that provides the compression function. In the preferred embodiment, this feedback network is a pair of CMOS transistors connected as a complementary follower circuit. At the levels of current which some of the processing elements in processor planes of interest output, such as pixel processing elements in an artificial retina, the CMOS transistors operate in the subthreshold region. In this region, the I-V characteristic is exponential, and the gate to source voltage is approximately equal to the natural logarithm of the output current from the processor. For other applications where the output current from the processor may be at a higher magnitude, the diode connected CMOS transistors operate above threshold, where the I-V characteristic is quadratic and the gate to source voltage is approximately equal to the square root of the drain current. Either region provides a nice compression function since the gate to source voltage of the diode connected CMOS transistors is essentially the output voltage from the scanning apparatus since the inverting input is at a virtual ground for arbitrarily large gain of the differential input amplifier.

The preferred embodiment has the significant advantage that the differential input amplifier and the non linear feedback network need not be fabricated at every processor location in integrated versions of the invention. This saves substantial chip area at each processor location and minimizes the routing problem of routing power, ground and reference voltage connections to each processor location with the associated loss of chip area to the buses for such connections. A further advantage is that by virtue of the negative feedback of the differential input amplifier, the column line is held at a constant voltage and is a virtual ground. This minimizes the need for the miniscule output current from the processor to substantially change the voltage of the parasitic capacitance of the column line. This arrangement minimizes the delay associated with using a tiny output current to cause a voltage change on the column line which is large enough to be sensed. A further advantage of the structure of the preferred embodiment is the compression of the dynamic range of the output current to a smaller and more usable dynamic range through the exponential transfer characteristic of the non linear feedback network substantially without any loss of information.

There are many alternative embodiments for the invention. For example, the pass transistors may be a single transistor, and the non linear feedback network could be any network that provides a suitable compression factor for the large dynamic range of the output current from the processing elements. Further, the differential input amplifier may be any generic differential input amplifier which does not render the circuit unstable. A single stage transconductance amplifier is preferred. One specific alternative embodiment uses two CMOS pass transistors coupled as in the preferred embodiment between the processor and the column line. The column line in this embodiment however is coupled to a reference voltage line through a pair of diode connected CMOS transistors having their gates tied to their drains and to the reference voltage line. A differential input amplifier is then coupled to amplify the gate to source voltage of the pair of CMOS transistors. Specifically, this amplifier has its non inverting input coupled to the shared gate/voltage reference line or node and has its inverting input coupled to the column line. This embodiment shares the advantage of savings in chip area over some of the prior art and has the further advantage that the output of the amplifier can be made to be a current or a voltage. However, this embodiment does not stabilize the voltage on the column line which varies as the natural logarithm of the output current from the processor in embodiments where the output current is sufficiently small to force the diode connected transistors to operate in the subthreshold region. In higher current embodiments operating in the quadratic transfer characteristic region of saturation, the voltage on the column line varies as the square root of the output current.

BRIEF DESCRIPTION OF THE DRAWINGS

FIG. 3(b) is a diagram of a prior art scanning circuit involving a differential input amplifier coupled to convert a differential output voltage from the pixel processor to an output current or voltage.

FIGS. 8(a) through 8(f) are diagrams of the preferred embodiment of a scanner circuit according to the teachings of the invention having various alternative structures for the non linear feedback element.

DETAILED DESCRIPTION OF THE PREFERRED EMBODIMENT

Figure 1:
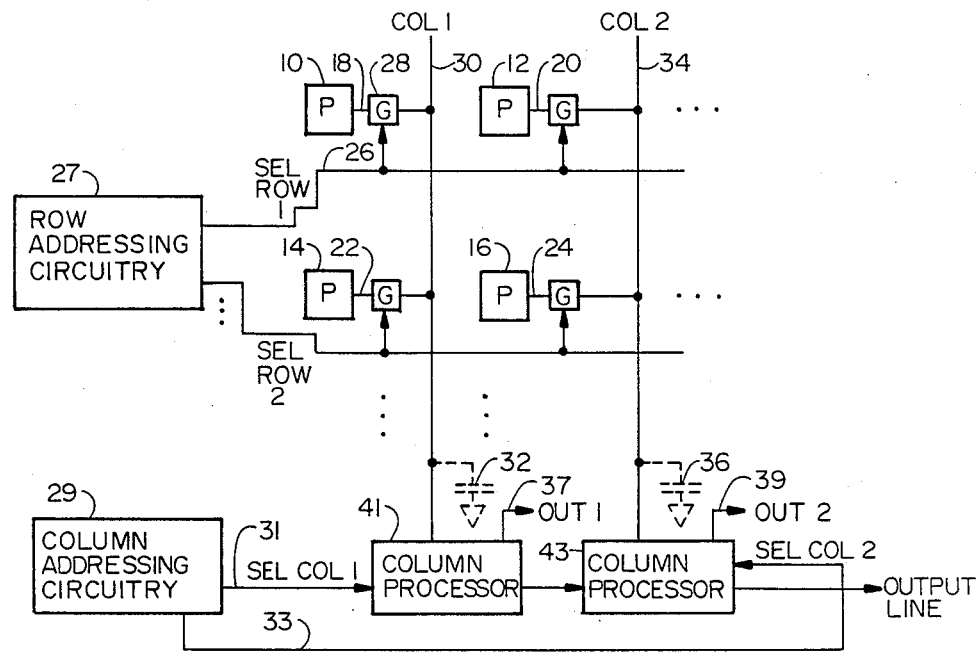
FIG. 1 is a drawing of a matrix of processing elements in a processor plane shown with the typical scanning layout of row address lines, pass gates, column lines and column processing elements.

FIG. 1 illustrates a typical situation in which the problem solved by the invention arises. A processing surface comprised of a plurality of processing elements 10, 12, 14 and 16, etc., is shown. These processing elements are arranged in rows and columns. The configuration of the processing elements 10–16 is not important to the invention. Each of these processing elements generates output information in the form of a current signal having certain typical characteristics. Typically each output from an individual processor is a current signal which can change in sign, is small in magnitude and which can represent significant information over a large dynamic range, as much as $10^5$. These current signals are output on the lines 18, 20, 22 and 24. In order to read the information from a processing plane organized as shown in FIG. 1, it is necessary to selectively enable each row and then sequentially read the output signal from each processor in the row. Normally, this is done on a column by column basis by use of the conventional column addressing circuitry 29 to generate column select signals such as the signals on the lines 31 and 33 thereby enabling each column to sequentially read out each processor's information in the row which is enabled. Subsequently, the next row is enabled and the process of enabling all the columns sequentially is repeated. For example, the information from processor 10 is read by activating a "select" signal SEL for row 1 on line 26. This signal is generated by conventional row addressing circuitry 27 which sequentially activates each row select signal for each row in turn. The activation of the row select signal on line 26 enables a gate or selector circuit 28 which couples the current signal on line 18 to the column line for column 1, line 30. In the embodiments to be described below, the circuitry coupling the individual analog processing device or processor on the processing surface to the column line is to be understood as the circuitry that implements the function stated above for the gate circuits of which circuit 28 is typical. Likewise, it is to be understood that in the embodiments described below, the circuitry connected to each column line which converts the output current from the processor to an output signal such as the signals on lines 37 and 39 is the circuitry embodied by the column processor circuitry of which processing elements 41 and 43 are typical.

Note that the column line 30 is shared by all the processing elements in the first column of which processing elements 10 and 14 are typical. This results in the column line 30 being long if the processor plane is large, and consequently, each column line like column line 30 has a large parasitic capacitance associated with it. This parasitic capacitance for column line 30 is shown in dashed lines at 32 and is shown at 36 for column line 34.

A problem arises because of the small magnitude of the current signal output from each processor. The problem in this regard is how does one scan the entire array rapidly to obtain the information from each processor with such a small current signal available to charge and discharge such a relatively large parasitic capacitance to which each current signal is coupled. Those skilled in the art will appreciate that using a small current to charge a relatively large parasitic capacitance, will result in voltage on the capacitor, i.e., the column line, which will not change appreciably for a relatively long period of time compared to the time available typically to scan the whole array. How long it takes for the column line to change in voltage sufficiently to be detected by the column processor connected to the column line depends upon the relative magnitude of the parasitic capacitance versus the magnitude of the current signal which is charging or discharging the capacitance.

To scan the information off the processing plane rapidly, several alternatives are possible. One is to drive the column lines with a sufficiently high current to change the voltage on the column line sufficiently rapidly to detect the desired information. Another alternative is to live with the inability to change the voltage on the column line rapidly but use circuitry which can derive the information from each processor within the time allotted for scanning that processor's output. In other words, as to the latter approach, it is necessary to be able to derive the information from the processor without changing the voltage on the column line substantially and without substantially increasing the scanning time allotted to each processor.

Another major problem which must be handled in order to use such processing planes effectively is how to process current signals at the output of each processor which can change signs. There are some processing circuits such as current mirrors which can be coupled to the column lines for column processing, but these circuits can only handle input currents which flow in only one direction.

Another major problem is how to solve the above noted problems without losing the information content from an output current signal which can vary in amplitude by as much as five orders of magnitude.

As a specific example of this latter point, suppose the processing elements 10 through 16 are pixel processing elements on an artificial retina. Such processing elements are designed to generate output signals which contain information about the light intensity and spatial gradients of the light intensity patterns in their local areas on the processing plane. Such signals can vary in magnitude by as much as the light intensity on the processing plane varies in intensity. These intensity variations must be reproduced accurately by the external processing circuitry if the system is to have any utility. Thus, many fine shades of intensity over a range of intensities varying by a factor of $10^5$ must be resolved by the system. The scanning circuitry, including the selection or gate circuits and the column processing circuits, must be able to handle rapidly these very small currents having changing signs and wide dynamic ranges without losing the information content contained therein. Simple binary states for the output signals from each processor will not do since the processing elements are generally analog in nature and much information is contained in the analog signals in the form of gray scale amplitudes somewhere between the minimum and maximum amplitudes.

Figure 2:
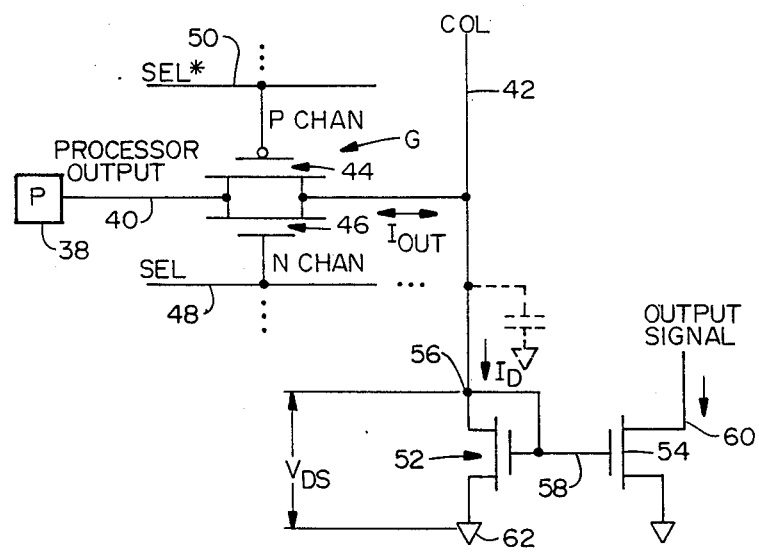
FIG. 2 is a diagram of one type of scanning circuitry that can be used to scan data contained in current signals at the output of the individual processing elements on a processing plane.

One possible way of scanning such signals is shown in FIG. 2. There, the output current signal from a processor 38 on a line 40 has a magnitude of approximately $10^{-8}$ amperes and a variable sign and can vary in amplitude by several orders of magnitude. This signal is coupled to a column line 42 through a gate circuit comprised of two CMOS transistors 44 and 46. These CMOS transistors each have their gates connected to row select lines carrying the select signals SEL on line 48 and SEL* on line 50. These two row select signals are activated simultaneously with the select signal on line 50 being active low. This causes both gate transistors 44 and 46 to be conductive, thereby allowing the output current on line 40 to be coupled to the column line 42 regardless of which direction the current on line 40 is flowing.

The delay problem caused by attempting to scan the output signal from the processor 38 using a column line 42 with a large parasitic capacitance relative to the magnitude of the processor output current on line 40 can be minimized by using a current mirror coupled to the column line 42. This current mirror is comprised of a transistor 52 having its gate coupled to its drain node 56 and a transistor 54 having its gate coupled to the gate of the transistor 52. Both transistors 52 and 54 are NMOS enhancement mode devices operating in the subthreshold region because of the very small amplitude of the drain current $I_D$ flowing in the column line 42. In other embodiments, other transistors can be used. The use of this current mirror provides a compression function to handle the large dynamic range of the output current on the line 40. The current on line 40 becomes the current on the column line 42 when the gating circuit comprised of transistors 48 and 50 is turned on. Because the transistor 52 has its drain coupled to its gate and because of the small magnitude for the drain current on line 42, those skilled in the art will appreciate that transistor 52 is constrained to operate in the subthreshold region where the gate to source voltage is always less than the threshold voltage. The threshold voltage is that gate to source voltage which is required to produce a strong inversion in the channel region of the MOS transistor, as will be understood by those skilled in the art. Until the gate voltage equals or exceeds the threshold voltage, no large signal current can flow from the drain to the source of an MOS transistor, but small currents over a range of five or more orders of magnitude may still flow.

When an MOS transistor is operated in the subthreshold region, its two terminal drain current versus gate to source voltage characteristic is an exponential function. When the drain current rises above the subthreshold region maximum level, which is approximately $10^{-6}$ amperes, the transistor becomes a square law device. In the subthreshold region, the gate voltage is proportional to the natural logarithm of the drain current and changes by approximately 100 millivolts for every tenfold change in the magnitude of the drain current. The exact expression for an MOS device operating in the subthreshold region is well known and is given in Ong, *Modern MOS Technology: Processes, Devices and Design,* pp. 88-90 (McGraw Hill 1984) which is hereby incorporated by reference. In the above threshold region, which is only of interest in certain applications or where the output current from the processor rises to an amplitude sufficient to drive the current mirror transistors into strong inversion, the gate voltage is proportional to the square root of the drain current. In other words, the drain current is proportional to the square of the gate to source voltage.

The logarithmic compression of the dynamic range of the output current in the circuit of FIG. 2, results from operating the current mirror transistors in the subthreshold region. The gate to source voltage from line 58 to the ground node 62 will vary in proportion to the natural logarithm of the drain current flowing in the column line 42. As a result, the large changes in magnitude of the output current on line 40 can occur without requiring associated large changes in the voltage on the column line 42 relative to ground. This eliminates the need to move the voltage of the column line 42 substantially in either direction to accommodate large changes in the output current $I_{OUT}$. Thus, the exponential $I_D$-$V_G$ characteristic of transistor 52 minimizes the delay problem by compressing the large variations in the current $I_D$ in column line 42 to substantially smaller changes in the voltage on the line 58, $V_{GS}$. The gate to source voltage on line 58 is coupled to the gate of the transistor 54 which can be a matched transistor. The voltage on line 58 can be output as a current or a voltage output signal on the line 60.

Since the voltage of the column line 42 cannot be moved rapidly anyway because of the small magnitude of the output current $I_{OUT}$, this compressing of voltage swings on the column line 42 is highly desirable and is a partial solution to one of the problems that need to be solved to scan a processing plane having output signals which are very small currents. Since the voltage $V_{DS}$ of the column line 42 is coupled to the gate of the transistor 54 by virtue of the connection between the drain node 56 and the gate node 58 of transistor 54, transistor 54 will have the same gate to source voltage as the transistor 52. As a result, if these two transistors are matched, the output current flowing in line 60 will be equal to the drain current $I_D$ flowing in the column line 42. This output signal current flowing in line 60 can be converted to a voltage by coupling some load device to the output signal line 60. Further, by proper design of the transistor 54, the current signal may be amplified to higher levels of output current on line 60.

Although the circuit of FIG. 2 provides nice compressive properties to handle the large dynamic range problem, it leaves another problem unsolved. That problem is that the output current $I_{OUT}$ can only flow in one direction for the current mirror transistors 52 and 54 to work in the manner described above. If the drain current $I_D$ were to reverse its direction of flow from that shown in FIG. 2, as where the current $I_{OUT}$ were to flow away from the column line 42, then the current mirror transistors 52 and 54 would fail to operate as described above since the drain node 56 would become the source node having a voltage lower than the voltage at ground 62. Since the circuit is not designed to work with current flow such as this, the circuit would fail of its essential purpose.

Figure 3A:
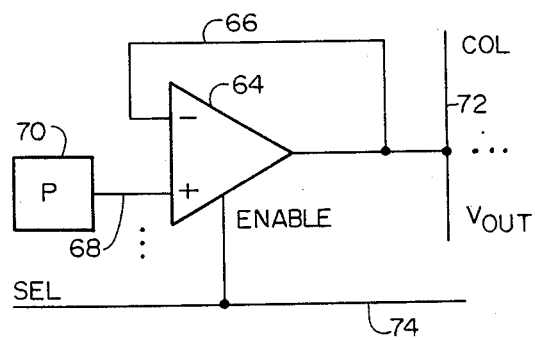
FIG. 3(a) is a diagram of a prior art scanning circuit involving a current to voltage converter in the form of a follower located at each processor location.

Two alternative ways of scanning a processing plane which have been attempted in the prior art are shown in FIGS. 3(a) and 3(b). FIGS. 3(a) and 3(b) each show a current to voltage converter circuit at every pixel location, the difference in these two circuits being that the circuit of FIG. 3(a) is adapted to handle processors with single ended voltage outputs and the circuit of FIG. 3(b) is adapted to handle processors having differential voltage outputs. In the circuit of FIG. 3(a), a differential input amplifier 64 coupled as a voltage follower with a zero resistance feedback path 66 from the output to the inverting input is used as the gating circuit. Those skilled in the art will appreciate that the input impedance at the non-inverting input 68 of such a voltage follower is essentially infinite. This creates a very high impedance (essentially zero conductance and very low capacitance) on the drains of the output devices in the processor 70. Processor 70 therefore is driving its output current into a very low capacitance seen at the input terminal 68 of the voltage follower and will therefore have a fast time response even for very low current levels. This variable voltage is coupled to the column line 72 with a gain of one by the differential input amplifier 64. Scanning is accomplished by enabling the differential input amplifiers on an entire row by activating the "select" signal SEL on line 74.

The advantage of the arrangement of FIG. 3(a) is that the amplifier 64 can generate a large current or voltage to drive the column line 72 thereby allowing greater speed of operation. If the column line 72 is open circuit, the amplifier 64 converts the signal on line 68 to a voltage on the column line 72. If the column line 72 is coupled to a current sense amplifier, the amplifier 64 outputs a current signal on the column line 72. Each column line such as the column line 72 is then scanned sequentially to obtain the output of each processor.

The circuit of FIG. 3(b) uses the differential input amplifier 64 to amplify the voltage difference output signal of the processor 70 appearing across the lines 71 and 73. The amplifier 64 drives the column line 72 with either a current signal or a voltage signal which is proportional to the potential difference across lines 71 and 73 depending upon whether the column line is open circuit or connected to a current sense amplifier.

The circuits of FIG. 3(a) and 3(b) have at least one advantage and at least one disadvantage. A principal advantage is that the amplifier 64 can provide sufficient driving current (or voltage) to the column line 72 to change the voltage on that line rapidly despite the fact that the line is loaded with parasitic capacitance which slows any attempt to change the voltage on the line. Further, the output signal of the processing element only needs to drive the input of the amplifier 64 and line 68 is a local conductor only so it has a low parasitic capacitance thereby speeding up operation. Since the input impedance of the amplifier 64 is essentially infinite, it does not draw any current from the processing element 70 thereby preventing loading down of the output of the processing element. The circuits of FIGS. 3(a) and 3(b) are therefore compatible with fast scanning of large numbers of processing elements on a processing plane where the operating currents in each element can be very low. However, typically a processing plane will be implemented in integrated circuit form on a single die. Thus, a major disadvantage of the structure of FIGS. 3(a) and 3(b) is the fact that a full differential input amplifier must be constructed at every processor location in the plane. Further, each of these amplifiers must be connected to power and ground supply lines which must be routed throughout the matrix of processing elements on the processing plane. This extra circuitry at each processor location, with its associated power and ground buses, severely limits the number of processing elements which can be placed on a commercially feasible die size. In other words, were it not necessary to place such circuitry at each processor location, more processing elements could be used, thereby achieving better resolution or more parallelism, or a smaller die could be used, thereby increasing the yield of the manufacturing process.

Figure 4:
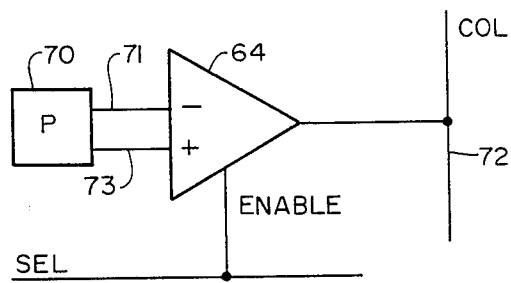
FIG. 4 is a diagram of another scanning circuit involving a current to voltage converter with a linear resistor feedback network and a differential input amplifier at every processor location.
Figure 4:
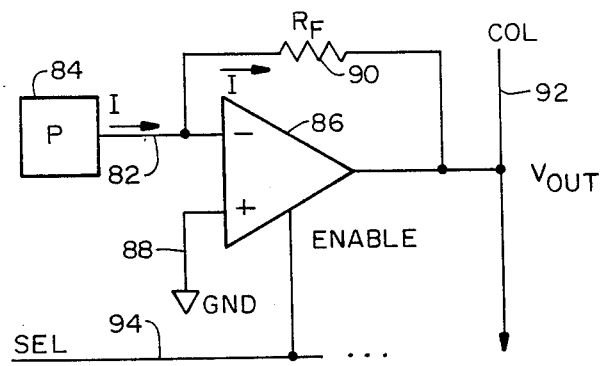

Another way of scanning a processor plane is through the use of a current to voltage converter circuit as shown in FIG. 4. In this circuit, the output current signal on line 82 from a typical processor 84 in the processor plane is coupled to the inverting input of a differential input amplifier 86. The noninverting input 88 of this amplifier is coupled to ground. A feedback resistor 90 is coupled from the output of amplifier 86 back to the inverting input coupled to line 82. The output of the amplifier is coupled to a column line 92, and the enable input of the amplifier is coupled to the row select addressing line 94.

In the circuit of FIG. 4, the inverting input of the amplifier 86 coupled to line 82 is held at virtual ground through the action of the negative feedback through the resistor 90 as is well understood by those skilled in the art. Because the amplifier 86 has an almost infinite input impedance, the output signal current I from the processor 84 flows through the feedback resistor 90 thereby generating an output voltage, $V_{OUT}$ on the column line 92 which is equal to $I \times R_F$, the value of the feedback resistance 90. This gives a smooth, linear transfer function for the circuit of FIG. 4 like that shown at 82 in FIG. 4. However, by virtue of the fact that the value of the feedback resistor 90 is fixed at one value, there is only one scale of currents which can be resolved by changes in output voltage on the column line 92. When the current I on line 82 is smaller or larger than the currents which can be resolved, information generated by the processor 84 will be lost.

The other difficulty of the circuit of FIG. 4 is the same as for the circuits of FIGS. 3(a) and 3(b). That is, the necessity to form a resistor and differential input amplifier at every processor location on the processor plane along with associated power supply and ground connections takes up a great deal of chip area.

Another problem with the structure of FIG. 4 is that linear resistors are not available in many conventional CMOS processes.

Figure 5:
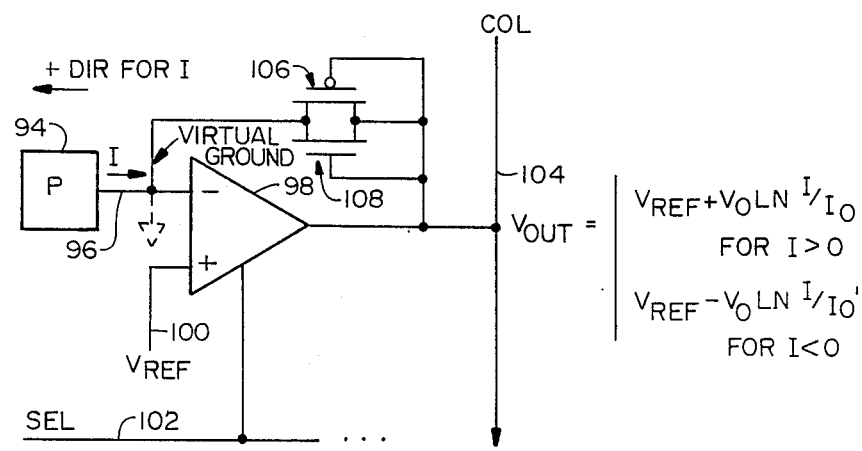
FIG. 5 is a diagram of a scanning circuit involving a current to voltage converter with an exponential feedback network and a differential input amplifier located at every processor location.

Another alternative scanning mechanism which can be used is shown in FIG. 5. Although it is believed that the circuit has been used before for other applications, as far as is known, the circuit has never been used for the scanning application of interest here. This scanning mechanism represents a current to voltage converter with a logarithmic compression implemented by a nonlinear feedback circuit. In this circuit the current output signal from the processor 94 on line 96 is coupled to the inverting input of a differential input amplifier 98. This differential amplifier has its noninverting input coupled to a reference voltage by line 100. The amplifier also has its select input coupled to an addressing line carrying the select signal SEL on line 102. The output of the amplifier 98 is coupled to the column line 104 and is also coupled back to the inverting input 96 via a pair of CMOS, diode connected transistors 106 and 108. This arrangement has a logarithmic transfer function which is useful for compressing the large changes in the magnitude of the current I on line 96 to relatively smaller changes of the output voltage $V_{OUT}$ on line 104. The expressions relating the output voltage $V_{OUT}$ to the input current I are shown to the right of the column line 104 in FIG. 5. The top expression defines the relationship when the current I is flowing in the positive direction, i.e., into the processor 94 and away from the differential input amplifier 98. The bottom expression governs the relationship when the current I is negative, or flowing into the inverting terminal of the amplifier 98. As can be seen from inspection of these two expressions, the difference between the output voltage on column line 104 and $V_{REF}$ is approximately the natural logarithm of the input current I on line 96. Thus, very large changes in magnitude in the current I are reflected as changes in the output voltage of much smaller size. Further, it can be seen that when the current I changes signs, there is a large change in the output voltage.

Figure 6:
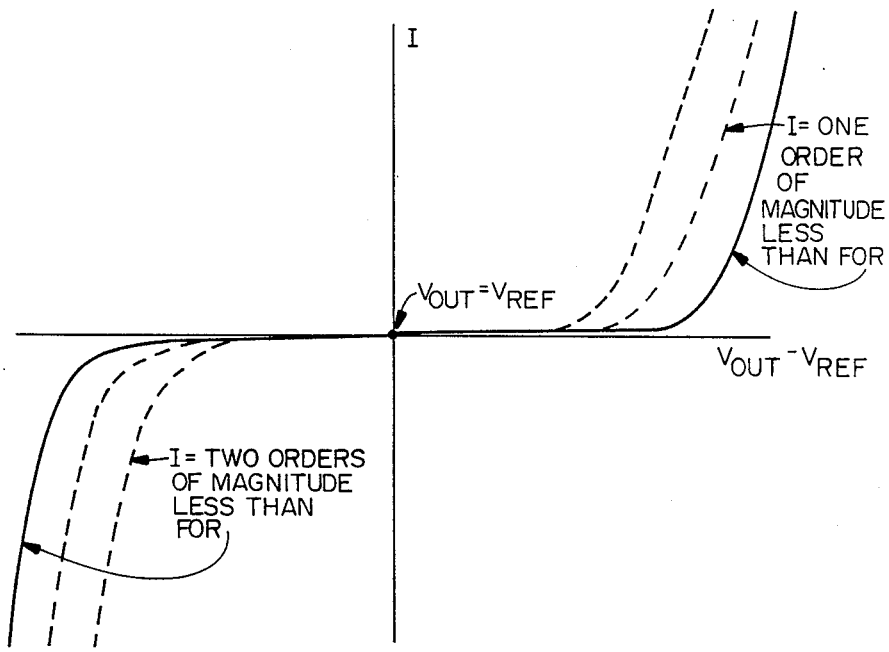
FIG. 6 is a graphical illustration of the transfer function of the circuit of FIG. 5 relating the signal current I from the processor to the output voltage on the column, line.

Graphical depiction of this relationship is shown in FIG. 6. It is seen from inspection of FIG. 6 that good resolution for changes in the current I can be obtained by determining the magnitude of the output voltage on the column line 104 for all values of the current I, and especially high resolution can be obtained for very small amplitudes on the positive and negative side of zero. The range of extreme resolution is set by the timescale of the measurement and the input capacitance of the amplifier.

The advantage of the structure of FIG. 5 is that it has very nice compression properties. The structure of FIG. 5 suffers the same disadvantages as the structures of FIGS. 5 and 3 in that a differential input amplifier with associated power and reference voltage connections plus a pair of CMOS transistors must be constructed at every processor location on the processor plane in addition to the circuitry of the processor itself. This limits the number of processing elements which can be put on the processor plane for die sizes giving acceptable yields.

A disadvantage of the circuit of FIG. 5 is that in applications where the processor 94 is a pixel processor with open circuit drains or is any other processor which causes the line 96 to go to either the supply voltage $V_{DD}$ or the ground voltage when the amplifier 98 is deselected, the channel capacitance of the pass transistors 106 and 108 can be charged to either $V_{DD}$ or ground. This alters the coupling capacitance from the column line 104 to the node 96 and can cause large transients on the column line when the column is selected.

Another problem with the circuit of FIG. 5 is that the electrical characteristics of the amplifiers 98 at every processor location can be different. That is, two processing elements 98 which are adjacent to each other on an integrated die and which have identical geometric layouts, can vary by as much as 40 mv in transistor offset voltages. These differences arise from process variations across the surface of the integrated circuit die. Adjacent transistors can vary by as much as 40 mv in threshold voltage. A 40 mv threshold voltage difference leads to 2½ times more current from one of the transistors when the transistor is operated in its subthreshold region.

Figure 7:
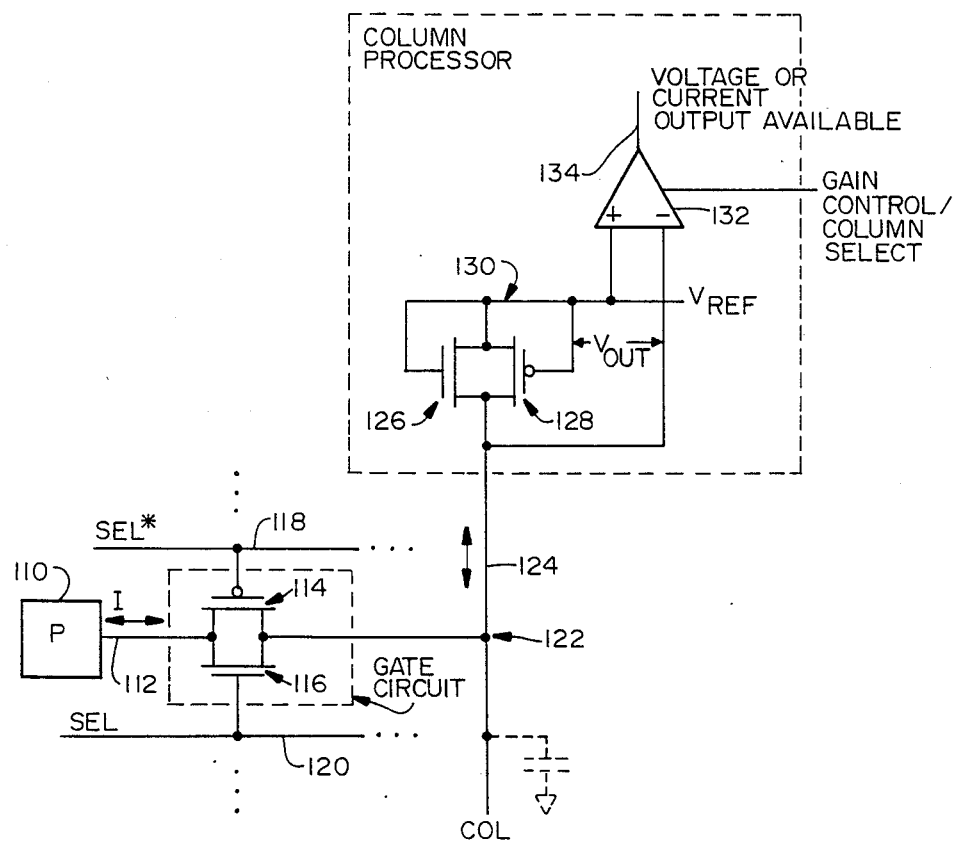
FIG. 7 is a diagram of one alternative embodiment of a scanner according to the teachings of the invention using an exponential compression function and a current to current or current to voltage conversion circuit located on each column line.

According to the teachings of the invention, one embodiment of a scanning circuit is shown in FIG. 7. In this embodiment, a processor 110 generates an output current signal I on line 112. As was the case for the other circuits discussed herein and the current I can be either positive or negative, has a small amplitude which carries significant information over many orders of magnitude. The current I is coupled through a pair of CMOS pass transistors 114 and 116 to the column data line 124. The source and drain terminals of these transistors are coupled together, and the gate terminals are coupled to addressing lines 118 and 120 carrying the select signals SEL* and SEL, respectively. These two addressing signals go active simultaneously with the signal on line 120 going active high and the signal on the line 118 going active low. Thus, regardless of the direction of current flow on line 112, one or the other of the pass transistors 114 or 116 will couple the current flow on line 112 to the node 122, thereby altering the current flow on the line 124 by Kirchoff's current law.

The column data line 124 is coupled to a pair of diode connected CMOS transistors 126 and 128. These transistors have their sources and drains coupled together with one of the shared source/drain terminals coupled to the column line 124 and the other shared source/drain terminal connected to a reference voltage, $V_{REF}$ on line 130. The gate terminals of each of the transistors 126 and 128 are coupled to the reference voltage line 130 also. A differential input amplifier 132 has its noninverting input coupled to the reference voltage line 130 and its inverting input coupled to the column line 124.

The circuit of FIG. 7 provides logarithmic compression of the large changes in magnitude of the current I on line 112 through the use of the diode connected transistors 126 and 128. These diode connected transistors 126 and 128 have the transfer function shown graphically in FIG. 6. The output voltage $V_{OUT}$ between lines 130 and 124 will be logarithmically related to the magnitude of the current I on 112 in the sense that the difference between the output voltage $V_{OUT}$ and $V_{REF}$ will be approximately the natural logarithm of the current I. Since the voltage across lines 130 and 124 is also coupled to the differential inputs of the transconductance amplifier 132, an output current at line 134 of any desired magnitude can be obtained by appropriately setting the gain of the amplifier 132. Further, the output of the amplifier 132 can be open circuited, such that the output signal on line 134 may also be a voltage. It is preferred that the amplifier 132 be a transconductance amplifier but this is not critical.

A key advantage of the structure shown in FIG. 7 is that the voltage on the column line 124 need not move substantially because of its exponential relationship to the magnitude of the current I on line 112. Further, the structure of FIG. 7 eliminates the need to fabricate a differential input amplifier and feedback circuitry and the associated power and reference voltage connections at the location of every processor on the processing plane. This saves substantial chip area on integrated versions of the invention and minimizes the numbers of connections and wires to each processor. The diode connected transistors 126 and 128 and the amplifier 132 need only be fabricated for each column line. This saves substantial chip area. The ability to convert the magnitude of the current I on line 112 to a voltage of any magnitude on line 134 is also important since it allows the delay problem caused by charging and discharging of capacitances coupled to line 134 to be minimized simply by driving these capacitances with a sufficiently large signal on line 134. The delay problem caused by the parasitic capacitance of the column line 124 for each column is also minimized by virtue of the logarithmic compression implemented by the diode connected transistors 126 and 128. This logarithmic compression allows the voltage on the line 124 to move only slightly for large changes in magnitude of the current I on line 112 thereby minimizing the need to change the voltage substantially on the parasitic capacitance of the column line 124.

Figure 8A:
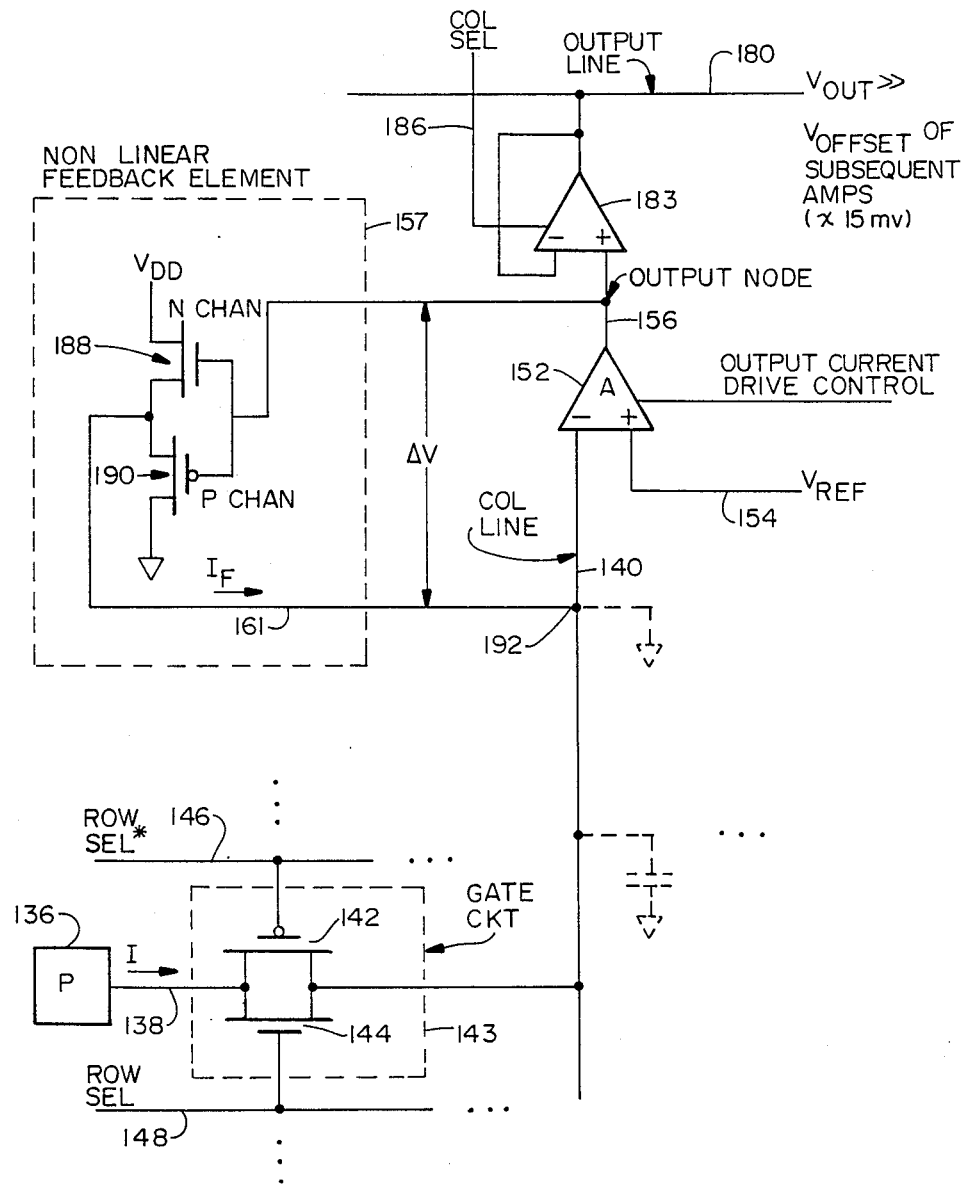
Figure 8B:
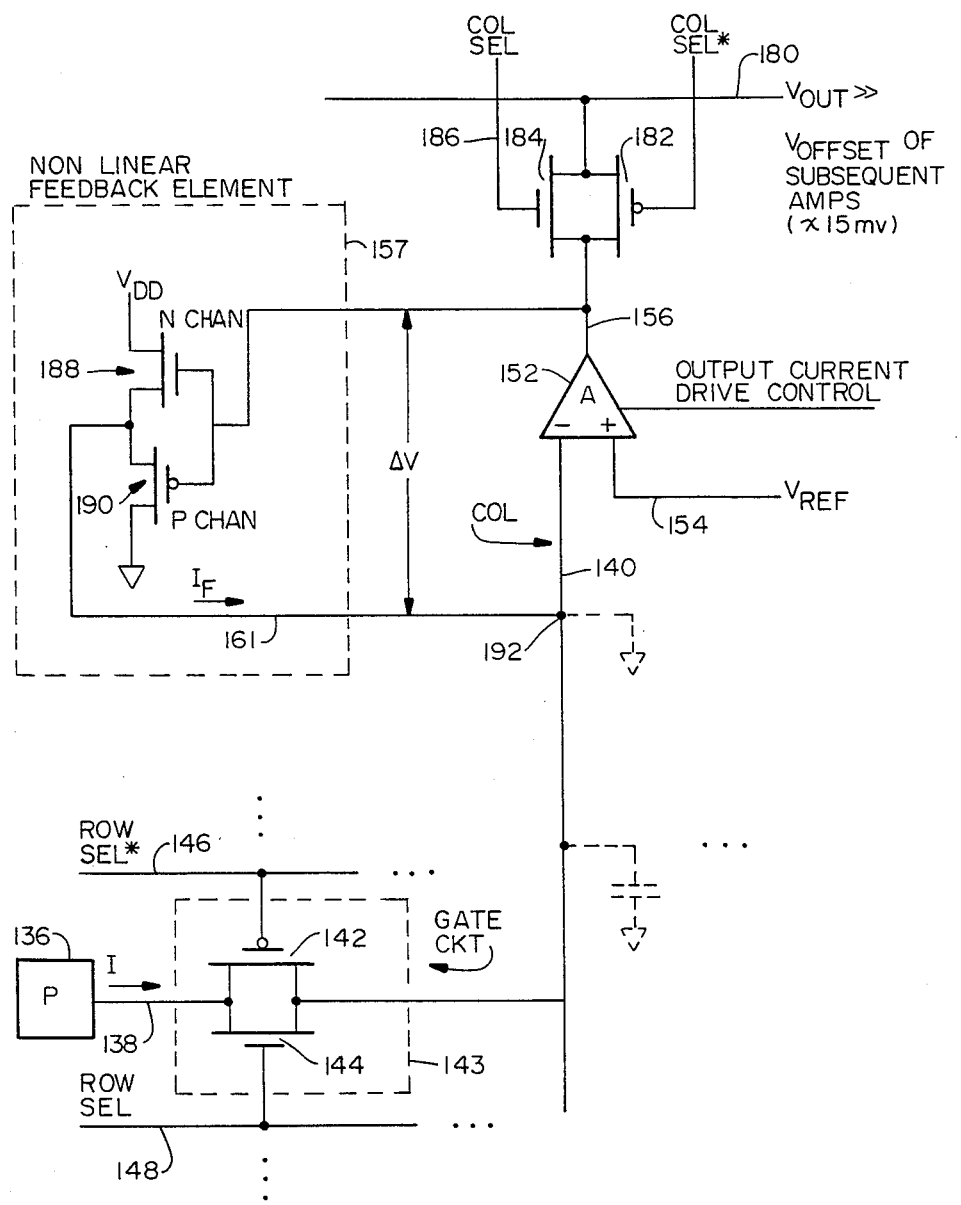
Figure 8G:
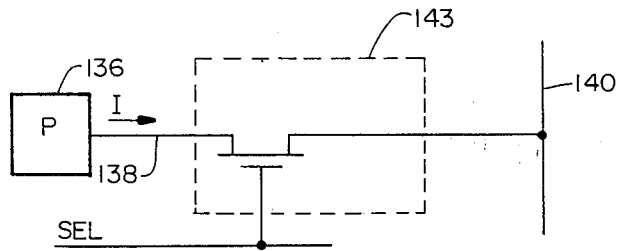
FIGS. 8(g) and 8(h) are alternative embodiments for the gate circuit located at each pixel to couple the output of the processor to the column line.
Figure 8H:
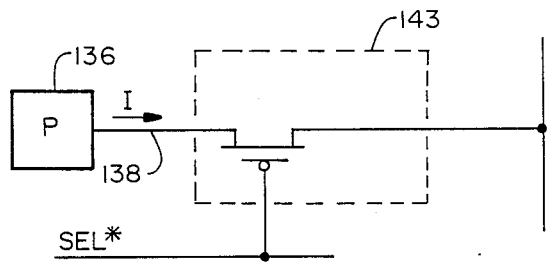

An even better version of the circuit of FIG. 7 is shown in FIGS. 8(a) through 8(h). These figures teach the preferred embodiment and variations thereof according to the teachings of the invention because they all utilize negative feedback which holds the voltage on the column line substantially constant, thereby further minimizing the delay problems associated with charging and discharging of the parasitic capacitance associated with each column line. FIG. 8(a) shows the preferred one of the preferred embodiments of FIGS. 8(a) through 8(h), and FIG. 8(b) shows a similar embodiment with a pair of pass transistors 182 and 184 used instead of the differential amplifier used for the output select function in FIG. 8(a). FIGS. 8(c) through 8(f) show alternative forms for the non linear feedback network 157 used in both the embodiments shown in FIGS. 8(a) and 8(b). FIGS. 8(g) and 8(h) show alternate forms of single transistor pass gates 143 which can be used in any of the embodiments shown in FIGS. 7 or 8(a) through 8(f). In the embodiments taught in FIGS. 8(a) through 8(f) using dual transistor pass gates, the processor 136 generates an output current I on line 138 which is coupled to a column line 140 via two CMOS pass transistors 142 and 144. Each of the pass transistors 142 and 144 has its gate coupled to the addressing signals SEL* on line 146 and SEL on line 148, respectively. When these two select signals simultaneously go active low and high, respectively, the pass transistors 142 and 144 couple the current flow on line 138 to a node 150 on column line 140 regardless of the sign of the current I on line 138 thereby altering the current flow in the column line 140. A differential input amplifier 152 has its inverting input coupled to the column line 140, and has its noninverting input coupled to a reference voltage on line 154. The value of the reference voltage, $V_{REF}$, is set near the midpoint between $V_{DD}$ and ground when using two CMOS transistors 188 and 190 connected as source followers as shown in FIG. 8(a).

This gate circuit 143 may also be a single N channel transistor as shown in FIG. 8(g) or a single P channel transistor as shown in FIG. 8(h). In fact, use of a single transistor gate circuit 143 is preferred since only on transistor has to be formed at each pixel location rather than two. If a single transistor is used for the gate circuit 143 certain other adjustments must be made. First, the selection of the type of single transistor to use for the gate circuit 143 should be made based upon the type of CMOS process that is to be used to fabricate the device. It is preferred to use the "native" transistor for the well type involved since the back gate bias effect on the threshold voltage is less for the native transistor. After the type of transistor to be used for the gate circuit 143 is selected, the voltage reference level $V_{REF}$ is set. If an N channel device has been selected as shown in FIG. 8(g), $V_{REF}$ is set to be closer to ground than to $V_{DD}$. If an N channel device is selected for the gate circuit 143, the transistors selected for the differential pair in the amplifier 152 should be preferably selected to be P channel. If a P channel device is selected for the gate circuit 143, the level of $V_{REF}$ should be set closer to $V_{DD}$ than to ground. Also, the transistors of the amplifier 152 should be preferably selected to be N channel. Specifically, if an N well CMOS process is used, an N channel device is preferred for the single transistor of the gate circuit 143, and the amplifier 152 should use a P channel differential pair. If a P well process is used, a single transistor gate circuit 143 should use a P channel device, and the amplifier 152 should use a differential pair of N channel devices. An embodiment could be made with a single transistor gate circuit and the differential pair in the amplifier being of the same channel type as the single transistor in the gate circuit 143, but this is not preferred. If a two transistor gate circuit 143 is used, as shown in FIGS. 8(a) and 8(b), there are no considerations of the type mentioned above on the type of transistors selected for the amplifier 152.

The gate circuits of FIGS. 8(g) and 8(h) may also be used as the gate circuits in other embodiments of the invention disclosed herein with similar considerations.

The output line 156 of the embodiments of FIGS. 8(a) through 8(h) is coupled back to the inverting input and to column line 140 by a non linear feedback element 157 which can take at least 5 different forms. In the preferred form shown in FIG. 8(a), two CMOS transistors 188 and 190 connected in series as source followers and operating in the subthreshold region convert the voltage on the line 156 to a feedback current $I_F$ flowing into note 192 which is at a virtual ground voltage level as symbolized by the ground connection shown in dashed lines. In this configuration, the P channel device is used to pull the voltage on the node 192 toward ground (more negative), and the N channel device is used to pull the voltage on the node 192 toward $V_{DD}$ (more positive). Since the feedback is negative, the resulting feedback current $I_F$ that results tends to counteract the effects on the voltage at node 192 of the current I on line 138 when it is coupled to the column line 140 thereby preventing large voltage swings on the column line 140. The reason that feedback element of FIG. 8(a) is preferred is that the source of the feedback current $I_F$ is the source of the supply voltage $V_{DD}$ instead of the amplifier 152. This allows the output of the amplifier to respond faster to changes in the input current.

The non linear feedback element 157 shown in FIGS. 8(a) and 8(b) as well as the other non linear feedback elements shown in FIGS. 8(c) through 8(f) all provide a transfer function with a common characteristic shown in FIG. 6. That characteristic is that the feedback current $I_F$ increases faster than linearly as a function of the difference voltage delta V between line 156 and the node 192 for positive delta V, and $I_F$ increases faster in the negative direction for $I_F$ than linearly as a function of delta V for negative delta V. Also, $I_F$ is no greater than the leakage current of the transistors to their bulk for zero delta V. Any non linear feedback element that provides this transfer function will suffice for purposes of practicing the invention. FIGS. 8(c) through 8(f) show alternative non linear feedback elements that provide this transfer function. The transistors of these feedback elements are all operated in the subthreshold region. It is also possible to use two standard diodes connected in parallel anode to cathode at one terminal and anode to cathode at the other terminal to provide a current path for $I_F$ regardless of its sign, with one shared anode/cathode terminal coupled to the line 156 and the other shared anode/cathode terminal coupled to node 192. It is also possible to use the parasitic bipolar transistor associated with the CMOS well as part of the non linear feedback element. It is also possible to use Schottky diodes with aluminum contacts to the well diffusion for the non linear feedback element.

In the embodiment shown in FIGS. 8(a) and 8(b), the non-linear feedback element is a pair of CMOS, source follower connected feedback transistors 188 and 190. These transistors provide an approximately logarithmic relationship between the difference of the output voltage on line 156 and $V_{REF}$ and the input current $I_F$ on line 161. The approximate mathematical expression for this relationship is as shown to the right of the column line 104 in FIG. 5.

Because of the high gain of the amplifier 152 in the embodiments of FIGS. 8(a) through 8(h), the negative feedback connection to the column line 140 holds the column line at a nearly fixed potential, and the only source of current is the current I from the selected processor 136. The voltage $V_{OUT}$ on line 180 is proportional to the natural logarithm of the current I on line 138. This provides a nice compression such that large changes in magnitude of the current I on line 138 can be easily tracked and resolved by the output voltage on line 156. Further, the negative feedback and operation of the differential input amplifier 152 is such that the column line 140 is held steady in voltage and is a virtual ground. This eliminates the delay problem associated with large changes in magnitude of the current I on line 138 being coupled to the column line 140 and its parasitic capacitance 162. The fact that the column line 140 is held at the reference potential $V_{REF}$ by the operation of the differential amplifier 152 for a gain A of that amplifier which is arbitrarily large is well understood by those skilled in the art. A derivation of this concept is taught in the treatise *Operational Amplifiers* edited by Tobey, Graeme and Huelsman at pages 428–430 (McGraw Hill 1971) which is hereby incorporated by reference in its entirety. A derivation of why the feedback circuit incorporating diodes in the feedback loop implements a logarithmic function is taught in the same treatise at pages 258–266.

It is fundamental to the circuitry shown in FIGS. 8(a) through 8(h) that because the input impedance of the amplifier 152 is essentially infinite, no current flowing in the column line 140 flows into the inverting input of that amplifier. Instead, the current flowing in the column line 140 flows through the nonlinear feedback network as the feedback current IF. Since the current flowing through a sub-threshold transistor is exponentially related to the voltage between its gate and its source, the natural logarithmic compression of the circuits of FIGS. 8(a) through 8(h) arises. The circuits of FIGS. 8(a) through 8(h) also enjoy the same advantage as the circuit of FIG. 7 in simplifying the processor location on the processor plane since the feedback network and differential input amplifier need not be fabricated at every processor location but only at the location of each column.

Returning to the consideration of the embodiment of FIG. 8(b), because of the gain of the amplifier 152, the voltage on line 156 will be nearly equal to the reference voltage, $V_{REF}$ when the current I on line 138 is zero. The output line 156 is coupled to the output line 180 by a pair of parallel connected, CMOS pass transistors 182 and 184. The N channel transistor 184 has its gate 186 coupled to a column select addressing signal COL SEL. The gate of the P channel device has its gate coupled to the complementary column select signal COL SEL*. The sources and drains of the transistors are coupled in parallel such that the signal on the line 156 is coupled to the output line 180 through the channel of one of the two transistors 182 and 184 regardless of the sign of the signal on line 156.

In contrast to the embodiment shown in FIG. 8(b), the embodiment shown in FIG. 8(a) is preferred because the conductance of the amplifier 183 is very low which reduces the capacitive coupling between the node 156 and the output line 180. This prevents the changes in voltage on the line 180 which occur during the horizontal scanning process and the voltage transients on the line 180 from disturbing the voltage on the node 156.

The differential input amplifier 152 can be any differential input amplifier so long as the required circuit stability criteria is met. Operational amplifiers are not preferred for the amplifier 152 since they have built-in compensation capacitors which cause the amplifier to have its own built-in roll off characteristic. Since the column line 140 has a parasitic capacitance 162 associated with it, the column line 140 itself has a roll off characteristic and a time constant associated with it. Also, the parasitic capacitance of output line 156 will have a time-constant associated with that node. If an operational amplifier with its own time constant, i.e., roll off characteristic is used, a three time constant circuit results which can, in some conditions, become unstable. Therefore, it is preferred to use the transconductance amplifier shown in FIG. 9 for the differential amplifier 152. However, other forms of differential input amplifiers which can be used in the circuit without creating undue instability are also acceptable.

Any suitable compression function generator may be substituted as the feedback circuit. In other words, any compression function which relates the output voltage on line 156 to the current I on line 138 such that very large changes in magnitude of I can be accurately mapped and resolved by the output voltage on line 156 will suffice for purposes of practicing the invention. Such a compression function is shown at FIG. 6.29 at page 261 of the "Operational Amplifiers" treatise cited above. This particular compression function uses a diode function generator implemented using differential input amplifiers with nonlinear feedback networks. However, other forms of compression circuits may also be used, such as a square root function.

Figure 9:
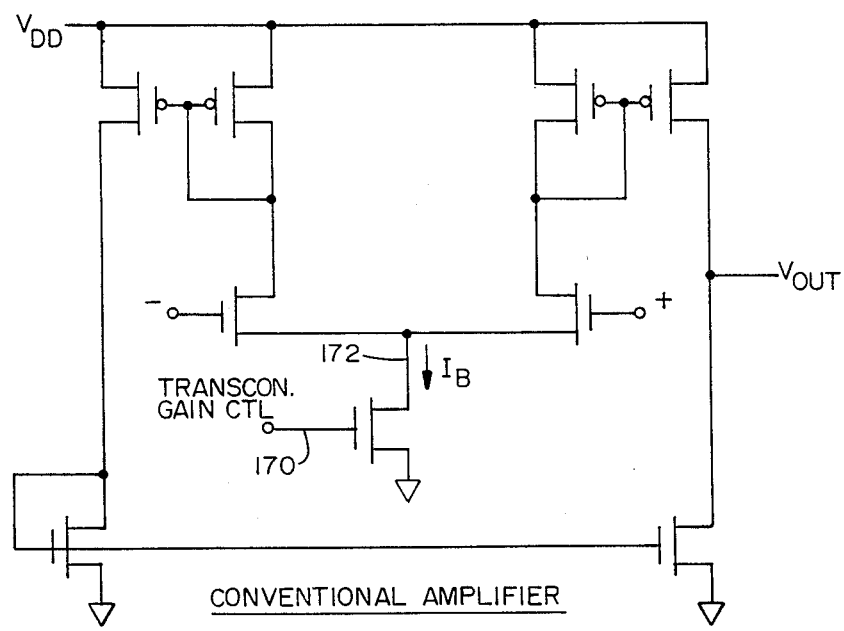
FIG. 9 is a diagram of a transconductance amplifier according to the teachings of the invention.

The transconductance amplifier of FIG. 9 is conventional. The transconductance gain control input on line 170 is used to set the current $I_B$ on line 172 to be very large compared to the current flowing in the column line 140. This insures that the constant of output node 156 will be much smaller than the time constant associated with the column line 140, so that the feed back loop will be stable under all conditions of operation.

The principle advantage that the circuits of FIGS. 8(a) through 8(h) have over the circuit of FIG. 7 is that the voltage of the column line 140 is stabilized in the embodiment of FIGS. 8(a) through 8(h) whereas the voltage of the column line 124 in the embodiment of FIG. 7 moves up and down with changes in the input current I on line 112, and particularly when the current I changes sign, in accordance with the transfer function graphically illustrated in FIG. 6. However, one advantage that the embodiment of FIG. 7 has over the embodiments of FIGS. 8(a) through 8(h) is that the amplifier 132 can be used to amplify the junction voltage across the junctions of the diode transistors 126 and 128.

An advantage that the embodiments of FIGS. 8(a) through 8(h) has over other embodiments disclosed herein is that there can be no capacitive feedback of voltage transients on the column line 140 into the processing elements. In the embodiments of FIGS. 7 and 8(a) through 8(h), changes of voltage on the output signal lines from the processing elements 138 and 112 cannot charge the channel capacitance of the pass transistors 142, 144, 114 and 116 since the lines 112 and 138 are not connected to the gates of these transistors. Therefore, the processing elements cannot inadvertently affect the parasitic capacitance associated with the column lines 140 and 124 when the pass gate transistors are turned off. This eliminates the effects of deselected rows on the capacitance of the column line from adversely affecting operation via whichever row of processing elements is currently selected. Although the invention has been described in terms of the preferred and alternative embodiments detailed above, those skilled in the art will appreciate other modifications which may be made to utilize the ideas embodied in the teachings of the invention without departing from the spirit and scope of the teachings of the invention. All such modifications are intended to be included within the scope of the claims appended hereto.

What is claimed is:

1. An apparatus for reading a current signal from a source in an array of sources, each current having a changeable sign, a small amplitude and several orders of magnitude dynamic range comprising:
   a first conductor;
   a second conductor means for carrying a first addressing signal;
   coupling means for coupling said current signal to said first conductor upon receipt of said first addressing signal;
   an output node;
   compression means having an input for coupling to a source of a reference voltage and coupled to said current signal only through said first conductor and coupled to said output node for converting said current signal to an output signal at said output node by a transfer function relating the voltage difference between the voltage at said output node and said reference voltage to said current signal such that said current signal increases faster than linearly in the positive direction for positive voltage differences and increases faster than linearly in the negative direction for negative voltage differences.

2. The apparatus of claim 1 wherein said compression means includes means having an exponential transfer function for causing the voltage difference between said output signal at said output node and a predetermined voltage to be approximately equal to the natural logarithm of said current signal.

3. The apparatus of claim 2 wherein said compression means comprises a transconductance differential input amplifier having an output, an inverting input and a non inverting input, and having said output coupled back to said inverting input through a non linear feedback network and further comprising a row conductor and isolation means having a control input for receiving an addressing signal and coupled between said output node to said row conductor for selectively coupling the signal at said output node to said row conductor upon receipt of said address signal.

4. The apparatus of claim 3 further comprising a first input for coupling to a first bias voltage source and a second input for coupling to a second bias voltage source, and wherein said non linear feedback network is comprised of a first MOS transistor of a first channel type having a drain terminal coupled to said first input and a source terminal coupled to said inverting input and a gate terminal coupled to said output of said amplifier and a second MOS transistor of a second channel type having a drain terminal coupled to said second input and having a source terminal coupled to said inverting input and having a gate terminal coupled to said output of said amplifier, and wherein said isolation means is a differential input amplifier having first and second differential inputs and an output, said first input coupled to said output node and said output coupled to both said row conductor and to said second input and having an enable input for receiving said address signal.

5. The apparatus of claim 4 wherein said transistors of said non linear feedback network operate in the subthreshold region.

6. The apparatus of claim 5 wherein said coupling means is comprised of a single MOS transistor having a first channel type and wherein said transconductance amplifier is comprised of a differential pair of MOS transistors with both transistors of said pair having the opposite channel type as said single MOS transistor of said coupling means 7. The apparatus of claim 5 wherein said coupling means is comprised of a first MOS transistor of a first channel type having its source terminal coupled to said current signal and its drain terminal coupled to said first conductor, and a second MOS transistor of a second channel type having its source terminal coupled to said first conductor and having its drain coupled to said current signal and wherein said first MOS transistor has its gate coupled to said first addressing signal and wherein said second MOS transistor has its gate terminal coupled to the inverse of said first addressing signal.

8. The apparatus of claim 1 wherein said compression means is a differential input amplifier having an inverting input coupled to said first conductor and having a non inverting input for coupling to a reference voltage source, and having an output, and further comprising a non linear feedback circuit coupled from said output to said inverting input wherein said current signal from said source in said array of sources is approximately equal to the current flowing through said non linear feedback circuit and further comprising a row conductor and isolation means coupled between said output node and said row conductor for selectively coupling the signal at said output node to said row conductor wherein said isolation means includes a pair of CMOS pass transistors each having a gate terminal coupled to receive an address signal and coupled between said output node and said row conductor so as to selectively couple the signal on said output node to said row conductor regardless of polarity of said signal when said address signals are in a predetermined state.

9. The apparatus of claim 3 wherein said non linear feedback network is comprised of a first MOS transistor of a first channel type having a drain terminal and a gate terminal both of which are coupled to said output and having a source terminal coupled to said inverting input, and a second MOS transistor of a second channel type having a drain terminal coupled to said source terminal of said first MOS transistor and having a gate and a source terminal coupled to said drain terminal of said first MOS transistor, both said first and second transistors being operated in the subthreshold region by virtue of the amplitude of said current signal.

10. The apparatus of claim 3 wherein said non linear feedback network is comprised of a first MOS transistor of a first channel type having drain, source and gate terminals and a second MOS transistor of a second channel type having drain, source and gate terminals, with the drain and source of said first and second MOS transistors, respectively, coupled to the output of said amplifier and the source and drain of said first and second MOS transistors, respectively, coupled to said inverting input of said amplifier, and the gate terminals of said first and second MOS transistors coupled to the inverting input of said amplifier, both said first and second transistors operating in the subthreshold region.

11. The apparatus of claim 3 wherein said non linear feedback network is comprised of a first MOS transistor having drain, source and gate terminals and a second MOS transistor of the same channel type as said first transistor and having drain, source and gate terminals, with the drain and source of said first and second MOS transistors, respectively, coupled to the output of said amplifier and the source and drain of said first and second MOS transistors, respectively, coupled to said inverting input of said amplifier, and wherein the gate terminal of one of said MOS transistors is coupled to said output of said amplifier and wherein the gate terminal of the other said MOS transistor is coupled to said inverting input of said amplifier.

12. An apparatus for reading information generated by a processor in an array of processing elements contained in a current signal generated by a processor, said current signal having a small amplitude and changeable sign and several orders of magnitude dynamic range, comprising:
a conductor shared by a plurality of said processing elements;
means having an input for a first addressing signal for coupling said current signal to said conductor upon receipt of said first addressing signal;
a differential input amplifier having an inverting input coupled to said current signal through said conductor and having a non inverting input for coupling to a reference voltage source and having an output; and
non linear feedback means coupled from said output to said inverting input of said amplifier for stabilizing the voltage on said conductor by negative feedback at a predetermined voltage and for causing the output voltage at said signal output to be within the operating limits of the amplifier for values of current flowing in said conductor having an amplitude varying by several orders of magnitude in either direction.

13. The apparatus of claim 12 wherein said amplifier is a transconductance differential amplifier having an output for presenting an output signal derived from said current signal, an inverting input coupled to said conductor and a non inverting input for coupling to a reference voltage.

14. The apparatus of claim 13 wherein said feedback means is comprised of a first diode having an anode terminal coupled to said output of said transconductance difference amplifier and its cathode coupled to the inverting input of said transconductance amplifier and a second diode having its anode terminal coupled to said inverting input of said amplifier and having its cathode coupled to the output of said amplifier.

15. The apparatus of claim 13 wherein said feedback means is comprised of a first MOS transistor of a first channel type having a gate terminal coupled to said output and having a drain terminal for coupling to a first reference potential and having a source terminal coupled to said inverting input, and a second MOS transistor of a second channel type having a source terminal coupled to said source terminal of said first MOS transistor and having a drain terminal coupled to said inverting input of said differential input amplifier and having a gate terminal coupled to said output of said differential input amplifier, both said first and second transistors being operated in the subthreshold region by virtue of the amplitude of said current signal.

16. The apparatus of claim 13 wherein said feedback means is comprised of a first input for coupling to a first bias voltage source and a second input for coupling to a second bias voltage source and further comprises a first MOS transistor of a first channel type having a drain terminal coupled to said first input and a source terminal coupled to said inverting input and a gate terminal coupled to said output of said amplifier and a second MOS transistor of a second channel type having a drain terminal coupled to said second input and having a source terminal coupled to said inverting input and having a gate terminal coupled to said output of said amplifier.

17. The apparatus of claim 16 further comprising a row conductor and an isolation means coupled between said output of said differential input amplifier and said row conductor and having an input for receiving an address signal for selectively coupling the signal at said output of said differential input amplifier to said row conductor when said address signal is in a predetermined state.

18. The apparatus of claim 17 wherein said isolation means is a differential input amplifier having first and second differential inputs and an output, said first input coupled to said output of said differential input amplifier and said output coupled to both said row conductor and to said second differential input and having an enable input for receiving said address signal.

19. An apparatus for reading a current signal having a changeable sign, a small amplitude and several orders of magnitude dynamic range comprising:
   a first conductor;
   a second conductor means for carrying a first addressing signal;
   coupling means for coupling said current signal to said first conductor upon receipt of said first addressing signal using a single MOS transistor;
   compression means coupled to said first conductor and having an input for receiving a second addressing signal for converting the current signal to an output signal in the form of a voltage difference across said compression means such that said current signal increases in the positive direction faster than linearly as a function of the voltage difference for positive voltage differences and increases in the negative direction faster than linearly for voltage differences which are negative.

20. The apparatus of claim 19 wherein said compression means comprises a differential input amplifier having inverting and non inverting differential inputs and having an output wherein said non inverting input is for coupling to a source of a reference voltage and further comprising a first input for coupling to a first bias voltage source and a second input for coupling to a second bias voltage source, and further comprising a first MOS transistor of a first channel type having a drain terminal coupled to said first input and a source terminal coupled to said inverting input and a gate terminal coupled to said output of said amplifier and a second MOS transistor of a second channel type having a drain terminal coupled to said second input and having a source terminal coupled to said inverting input and having a gate terminal coupled to said output of said amplifier.

21. The apparatus of claim 19 wherein said compression means comprises a differential input amplifier having inverting and non inverting differential inputs and having an output wherein said non inverting input is for coupling to a source of a reference voltage and further comprises a first MOS transistor of a first channel type having a drain terminal and a gate terminal both of which are coupled to said output and having a source terminal coupled to said inverting input, and a second MOS transistor of a second channel type having a drain terminal coupled to said source terminal of said first MOS transistor and having a gate and a source terminal coupled to said drain terminal of said first MOS transistor, both said first and second transistors being operated in the subthreshold region.

22. The apparatus of claim 19 wherein said compression means comprises a differential input amplifier having inverting and non inverting differential inputs and having an output wherein said non inverting input is for coupling to a source of a reference voltage and further comprises a first MOS transistor of a first channel type having drain, source and gate terminals and a second MOS transistor of a second channel type having drain, source and gate terminals, with the drain and source of said first and second MOS transistors, respectively, coupled to the output of said amplifier and the source and drain of said first and second MOS transistors, respectively, coupled to said inverting input of said amplifier, and the gate terminals of said first and second MOS transistors coupled to the inverting input of said amplifier, both said first and second transistors operating in the subthreshold region.

23. The apparatus of claim 19 wherein said compression means comprises a differential input amplifier having inverting and non inverting differential inputs and having an output wherein said non inverting input is for coupling to a source of a reference voltage and further comprises a first MOS transistor having drain, source and gate terminals and a second MOS transistor of the same channel type as said first transistor and having drain, source and gate terminals, with the drain and source of said first and second MOS transistors, respectively, coupled to the output of said amplifier and the source and drain of said first and second MOS transistors, respectively, coupled to said inverting input of said amplifier, and wherein the gate terminal of one of said MOS transistors is coupled to said output of said amplifier and wherein the gate terminal of the other said MOS transistor is coupled to said inverting input of said amplifier.

24. An apparatus for scanning an array of processing elements each of which generates an output current signal and for generating a plurality of output signals each of which corresponds to one said output current from one said processor of said array, comprising a plurality of scanning circuits, each said scanning circuit comprising:
   a first conductor means shared by all the processing elements in a particular column of said array for carrying the output current signal of each processor in the particular column in a time multiplexed manner;

a second conductor means shared by all the processing elements in a particular row of said array for carrying a first addressing signal;

coupling means for coupling to said first conductor means upon receipt of said first addressing signal said output current signal from a corresponding one of said processing elements in the row of processing elements associated with the active first addressing signal;

compression means coupled to said first conductor means and shared by all the processing elements in said column and having an input for receiving a second addressing signal for, upon receipt of said second addressing signal, converting the output current signal coupled to said first conductor means to an output signal having a smaller dynamic range than the dynamic range of said output current signal regardless of the sign of said current signal;

row addressing means for sequentially activating each said first addressing signal for a time sufficient to allow all the processing elements in the appropriate row to have their output current signals read by the appropriate ones of said scanning circuits; and column addressing means for sequentially activating each said second addressing signal during the time during which any particular first addressing signal is active, each said second addressing signal being activated for a sufficiently long time to allow the conversion of the output current signal from the processor in the selected row and column to be converted to a corresponding one of said plurality of said output signals, and for repeating this process for the activations of all said first row addressing signals.

25. The apparatus of claim 24 wherein said compression means comprises a differential input amplifier having inverting and non inverting differential inputs and having an output wherein said non inverting input is for coupling to a source of a reference voltage and further comprising a first input for coupling to a first bias voltage source and a second input for coupling to a second bias voltage source, and further comprising a first MOS transistor of a first channel type having a drain terminal coupled to said firs input and a source terminal coupled to said inverting input and a gate terminal coupled to said output of said amplifier and a second MOS transistor of a second channel type having a drain terminal coupled to said second input and having a source terminal coupled to said inverting input and having a gate terminal coupled to said output of said amplifier.

26. The apparatus of claim 24 wherein said compression means comprises a differential input amplifier having inverting and non inverting differential inputs and having an output wherein said non inverting input is for coupling to a source of a reference voltage and further comprises a first MOS transistor of a first channel type having a drain terminal and a gate terminal both of which are coupled to said output and having a source terminal coupled to said inverting input, and a second MOS transistor of a second channel type having a drain terminal coupled to said source terminal of said first MOS transistor and having a gate and a source terminal coupled to said drain terminal of said first MOS transistor, both said first and second transistors being operated in the subthreshold region 27. The apparatus of claim 24 wherein said compression means comprises a differential input amplifier having inverting and non inverting differential inputs and having an output wherein said non inverting input is for coupling to a source of a reference voltage and further comprises a first MOS transistor of a first channel type having drain, source and gate terminals and a second MOS transistor of a second channel type having drain, source and gate terminals, with the drain and source of said first and second MOS transistors, respectively, coupled to the output of said amplifier and the source and drain of said first and second MOS transistors, respectively, coupled to said inverting input of said amplifier, and the gate terminals of said first and second MOS transistors coupled to the inverting input of said amplifier, both said first and second transistors operating in the subthreshold region.

28. The apparatus of claim 24 wherein said compression means comprises a differential input amplifier having inverting and non inverting differential inputs and having an output wherein said non inverting input is for coupling to a source of a reference voltage and further comprises a first MOS transistor having drain, source and gate terminals and a second MOS transistor of the same channel type as said first transistor and having drain, source and gate terminals, with the drain and source of said first and second MOS transistors, respectively, coupled to the output of said amplifier and the source and drain of said first and second MOS transistors, respectively, coupled to said inverting input of said amplifier, and wherein the gate terminal of one of said MOS transistors is coupled to said output of said amplifier and wherein the gate terminal of the other said MOS transistor is coupled to said inverting input of said amplifier.

29. An apparatus for scanning an array of processing elements arranged in rows and columns, each of said processors generating a current signal and for generating a plurality of output signals each of which corresponds to one said output current from one said processor of said array, comprising a plurality of column scanning circuits, each said column scanning circuit comprising:

a first conductor means shared by all the processing elements in a particular column of said array for carrying the output current signal of each processor in the particular column in a time multiplexed manner;

coupling means for each said processor in each row of said array, each said coupling means having an input for receiving a first addressing signal, for coupling said current signal output by the processing element associated with each said coupling means to said first conductor means upon activation of a predetermined state of said first addressing signal;

a differential input amplifier shared by all the processing elements in a column of said array and having an inverting input coupled to said first conductor means and having a non inverting input for coupling to a reference voltage source and having an output at which output signals corresponding to the processing elements in the column associated with said first conductor means appear; and feedback means shared by all the processing elements in a column of said array and coupled from said output to said inverting input of said amplifier for stabilizing the voltage on said first conductor means by negative feedback at a predetermined voltage and for causing the difference voltage between the output voltage at said output and the voltage at said non inverting input to be proportional to the natural logarithm of the signal current flowing in said first conductor means;

an output conductor associated with and shared by all the column scanning circuits of said array;

isolation means coupled between said output of said differential input amplifier and said output conductor and having an input for receiving a second addressing signal for selectively coupling the signal at said output to said output conductor when said second addressing signal is in a predetermined state;

and said apparatus for scanning the array further comprising:

row and column addressing means for sequentially activating a predetermined state of each of said first and second addressing signals in such a manner so as to read all the current signals of all or some defined portion the processing elements of said array.

30. The apparatus of claim 29 further comprising a row conductor and a first input for coupling to a first bias voltage source and a second input for coupling to a second bias voltage source, and wherein said feedback means is comprised of a first MOS transistor of a first channel type having a drain terminal coupled to said first input and a source terminal coupled to said inverting input and a gate terminal coupled to said output of said amplifier and a second MOS transistor of a second channel type having a drain terminal coupled to said second input and having a source terminal coupled to said inverting input and having a gate terminal coupled to said output of said amplifier, and wherein said isolation means is a second differential input amplifier having first and second differential inputs and an output, said first differential input coupled to said output node of said differential input amplifier and said output coupled to both said row conductor and to said second differential input of said second differential input amplifier, and said second differential input amplifier having an enable input for receiving said second addressing signal.

31. The apparatus of claim 29 wherein said feedback means is comprised of a first MOS transistor of a first channel type having a drain terminal and a gate terminal both of which are coupled to said output and having a source terminal coupled to said inverting input of said differential input amplifier, and a second MOS transistor of a second channel type having a drain terminal coupled to said source terminal of said first MOS transistor and having a gate and a source terminal coupled to said drain terminal of said first MOS transistor, both said first and second transistors being operated in the subthreshold region by virtue of the amplitude of said current signal.

32. The apparatus of claim 29 wherein said feedback means is comprised of a first MOS transistor of a first channel type having drain, source and gate terminals and a second MOS transistor of a second channel type having drain, source and gate terminals, with the drain and source of said first and second MOS transistors, respectively, coupled to the output of said differential input amplifier and the source and drain of said first and second MOS transistors, respectively, coupled to said inverting input of said differential input amplifier, and the gate terminals of said first and second MOS transistors coupled to the inverting input of said differential input amplifier, both said first and second transistors operating in the subthreshold region.

33. The apparatus of claim 33 wherein said feedback means is comprised of a first MOS transistor having drain, source and gate terminals and a second MOS transistor of the same channel type as said first transistor and having drain, source and gate terminals, with the drain and source of said first and second MOS transistors, respectively, coupled to the output of said differential input amplifier and the source and drain of said first and second MOS transistors, respectively, coupled to said inverting input of said differential input amplifier, and wherein the gate terminal of one of said MOS transistors is coupled to said output of said amplifier and wherein the gate terminal of the other said MOS transistor is coupled to said inverting input of said amplifier.

* * * * *